US005970596A

United States Patent [19]

Cardinaels

[11] Patent Number: 5,970,596

[45] Date of Patent: Oct. 26, 1999

[54] METHOD AND AN ASSEMBLY FOR POSITIONING AN ELASTIC TUBULAR COVERING ON AN ELEMENT

[75] Inventor: Jozef Cardinaels, Wetteren, Belgium

[73] Assignee: Alcatel Cable France, Clichy, France

[21] Appl. No.: 08/819,768

[22] Filed: Mar. 18, 1997

[30] Foreign Application Priority Data

Mar. 21, 1996 [FR] France .................................. 96 03518

[51] Int. Cl.[6] ............................ B23P 11/02; H01R 43/00

[52] U.S. Cl. ................................ 29/450; 29/235; 29/869

[58] Field of Search ............................ 29/235, 450, 868, 29/869

[56] References Cited

U.S. PATENT DOCUMENTS

| | | | |
|---|---|---|---|
| 3,786,553 | 1/1974 | Ma | 29/450 X |
| 4,654,241 | 3/1987 | Vallauri et al. | 29/235 X |
| 4,961,255 | 10/1990 | Vallauri et al. | 29/235 |
| 5,373,616 | 12/1994 | Biersdorf et al. | 29/235 |
| 5,495,650 | 3/1996 | Crepel et al. | 29/235 |
| 5,577,310 | 11/1996 | Cheenne-Astorino et al. | 29/869 X |

FOREIGN PATENT DOCUMENTS

| | | |
|---|---|---|
| 0631357A1 | 12/1994 | European Pat. Off. . |
| 2592825A1 | 7/1987 | France . |
| 2724444A1 | 3/1996 | France . |

*Primary Examiner*—S. Thomas Hughes
*Attorney, Agent, or Firm*—Sughrue, Mion, Zinn, Macpeak & Seas PLLC

[57] ABSTRACT

The method of laying and clamping an elastic tubular covering on an element consists in using a rigid tubular support mounted on the element and previously provided with said covering expanded thereon. In the laying method and the corresponding assembly, flexible associated auxiliary means that are strong in traction and not stretchable are provided for temporarily mechanically securing the expanded covering on said support to said element on which said covering is thus mounted and positioned. The invention is applicable to use at an end of an electric cable or at a junction thereof.

12 Claims, 2 Drawing Sheets

F 4 11 1 1B 2 5 7A 1A 6 7 10 7B I 16 12 13 3 15 6 F 6
6
1A
5
1
2
4
1B
3
3

1A
5
6
6
9
9
2
1
4
1B
3
3

METHOD AND AN ASSEMBLY FOR POSITIONING AN ELASTIC TUBULAR COVERING ON AN ELEMENT

The present invention relates to a method and to an assembly for tightly laying an elastic covering on an element. It applies particularly, but not exclusively, to terminations and splices for electrical power cables, in which the covering is an outer sleeve for providing protection and sealing, or an inner sleeve for functionally rebuilding a previously stripped terminal portion of each of the cables and for providing protection against electrical stresses, or else both such an inner sleeve and such an outer sleeve which are then put into place simultaneously.

BACKGROUND OF THE INVENTION

Document FR-A-2 592 825 describes an assembly for tightly laying such a covering on an element such as a cable or two cables that are electrically and mechanically interconnected. That assembly includes a rigid tubular support of dimensions designed so as to enable it to be mounted freely on the element, and the support is provided with a flexible film having a low coefficient of friction. The film is fixed to one end of the support and it extends freely over its outside surface. The covering is mounted on the laying assembly by being expanded so as to be positioned over the element. It is laid and simultaneously shrunk in place on the element by taking away the laying element from beneath the covering, while manually holding the covering in position over the element. As the rigid support is taken away, the film turns inside-out beneath the in-place shrunk covering. The film is taken away in turn from beneath the fully shrunk and in-place covering.

Document FR-A-2 706 976 discloses a laying assembly of the above-specified type but in which the flexible film having a low coefficient of friction is not fixed to the end of the support but is associated with means for guiding it and driving it around said end and over the inside surface of the support as the support is taken away from beneath the expanded covering that it carries.

The problem posed by such laying assemblies, or by any other laying assembly that can be taken away from beneath the expanded covering thereon, is that the covering is not always laid accurately on the desired location of the element, but moves to a greater or lesser extent together with the laying assembly which needs to be pulled hard in order to take it away.

To avoid such a problem, document FR-A-2 724 444 proposes in particular adopting a laying assembly of the kind described above but in which the rigid support is in the form of two mutually independent tubular portions which are placed end to end for receiving the expanded covering over both of them and which are taken away from beneath the covering one after the other, with means then being provided for fixing to the element the second of the two portions that is to be taken away from beneath the covering, while the first portion is itself being taken away.

The dispositions provided thereby are generally satisfactory, but they nevertheless require sufficient space in both directions along the element at either end of the assembly for laying the covering on the element to enable first one and then the other of the two portions to be taken away. They make it necessary to use a two-portion support even when it would be advantageous, if possible, to use a laying assembly having a support that is in a single portion, particularly for reasons associated with the overall time of the operations concerned and with the resulting overall cost. However, it is sometimes impossible to ensure sufficient space in only one or other of the two directions and thus impossible to use such dispositions, and in any event it is advantageous if only one space needs to be provided in one or other of the two directions in which the laying assembly can be taken away. These considerations mean that, whenever possible, it is preferable for the laying assembly to be constituted by a single portion, in which case it cannot be fixed to the element.

OBJECTS AND SUMMARY OF THE INVENTION

An object of the present invention is to avoid such a covering being incorrectly positioned on an element while a laying assembly over which the covering was initially expanded is being taken away, with this laying assembly being advantageously and in particular in the form of a single portion which is then taken away progressively in a single direction along the element, or optionally being in the form of two portions which can then be taken away in turn in opposite directions along the element.

The invention provides a method of tightly laying an elastic tubular covering on an element, the method consisting in using a rigid tubular support on which said covering is initially expanded, in positioning the expanded covering carried by said support around said element, and in taking away said support at least in part from beneath said expanded covering, by pulling on said support from a first end thereof, said support being of dimensions designed to allow it to be mounted freely on said element, the method consistings in providing temporary physical connection between said expanded covering on said support thus positioned on said element and a zone of the element situated beyond the second end opposite from the first end of said support, prior to taking the support away from beneath the covering and serving to hold said covering in position while the support is being taken away.

The invention also provides an assembly for laying tightly a resilient tubular covering on an element, the assembly comprising a rigid tubular support of dimensions designed to enable it to be mounted freely on the element, and the covering being mounted in expanded form on said support for the purpose of being laid on the element by taking said support away, at least in part from beneath said covering by pulling on the support from a first one of its ends, the assembly further including associated auxiliary means that are flexible, strong in traction, and not stretchable for temporarily mechanically securing said covering carried by said support to said element on which said support is mounted with said covering expanded thereon.

Said auxiliary securing means are, in particular, strips or an auxiliary sleeve, with one of the terminal portions thereof being prevented from moving in translation over, under, or against the expanded covering while the other terminal portion projects beyond the second end of the support for fixing on the element.

Advantageously, the auxiliary means have a series of holes along the projecting portion for indexing the position of the expanded sleeve.

BRIEF DESCRIPTION OF THE DRAWINGS

The characteristics and advantages of the present invention appear from the following description of embodiments given in the accompanying drawings, in which.

MORE DETAILED DESCRIPTION

Figure 1:
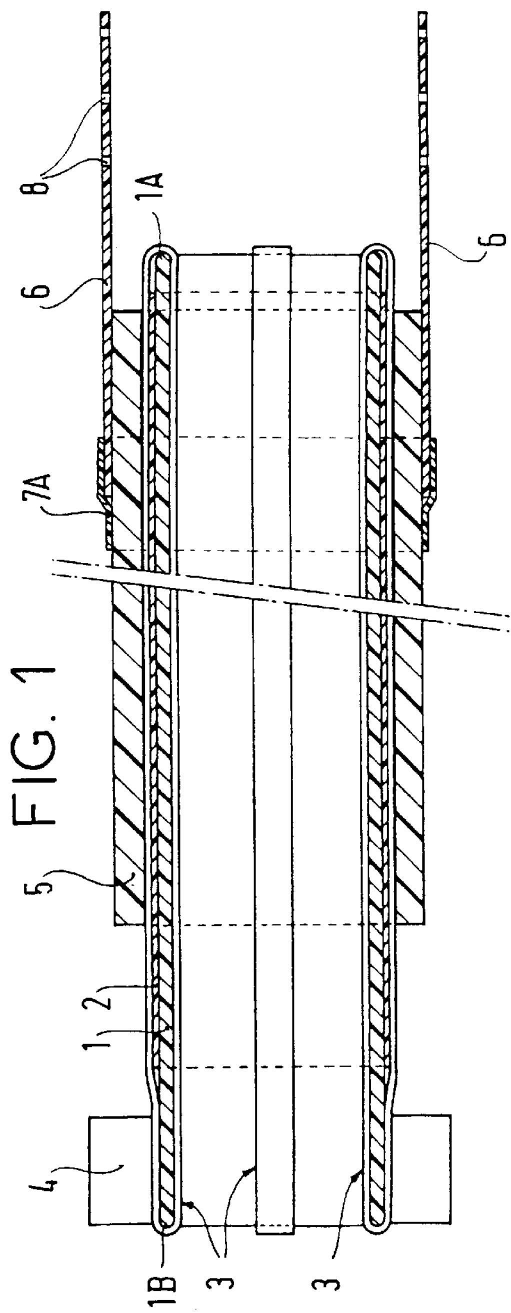
FIG. 1 shows an assembly of the invention for laying an expanded covering.

In the figures, reference 1 designates a rigid tubular support member which, in the embodiments illustrated, is a tube covered in a flexible film 2 having a low coefficient of friction. The film is entirely free on the tube. It extends initially over a fraction of the length of the outside surface of the tube, substantially starting from a second end 1A thereof. It is associated with guide and drive means 3 around said end 1A and along the inside surface of the tube.

The means 3 are constituted in particular by a set of strong flexible belts having a low coefficient of friction and forming loops which extend over the film and along the inside and outside surfaces of the tube, or in a variant which are coupled to the two ends of the film and otherwise extend over the outside surface of the tube and along its inside surface. The end 1A and the first end 1B of the tube are rounded to avoid tearing the film and/or the belts.

Grip means 4 are provided at the end 1B of the tube to make it easier to pull on the tube. The grip means are constituted in particular by segmented projecting shoulders provided between the belts on the periphery of the end portion at said end 1B of the tube.

This rigid tubular support, or a tube fitted in this way, constitutes an assembly for laying an elastic sleeve 5 which is mounted thereon in expanded condition, laying being performed by removing the support by force from beneath the sleeve by pulling on the support.

In a variant, the support may be constituted by a spiral-wound support which can then be removed from beneath the expanded sleeve by acting, from within the support and starting from one of its ends, to undo the end turn at the opposite end, followed by the subsequent turns.

To lay the expanded sleeve carried by the support on an element that is to receive it, the invention provides for auxiliary means 6 that are associated with and are fixed to the sleeve for fixing it to said element. The means 6 may in particular be constituted by flexible strips, that withstand traction but that are not stretchable, being made of optionally reinforced plastic, of metal, or of both metal and plastic.

In FIG. 1, these securing strips 6 are fixed to the periphery of the expanded sleeve by an adhesive tape 7A wound around the terminal portions thereof situated on said sleeve and around the sleeve. They project well beyond the end 1A of the support 1 and beyond the corresponding end of the sleeve.

The strips advantageously include a series of holes 8 that are regularly spaced apart at a short pitch along the projecting portions thereof for the purpose of indexing the position of the sleeve relative to each of them, and where appropriate for accurately positioning the sleeve as carried by its support over the element that is to receive it. This may apply, for example, when positioning said sleeve carried by its support on a cable that is provided with an end socket relative to which the sleeve for laying on the cable must be positioned. Under such circumstances, an appropriate one of the holes is used for fixing the strip to the socket by means of a pin or some other device, and the support is released along the cable and not from beneath the socket.

Figure 2:
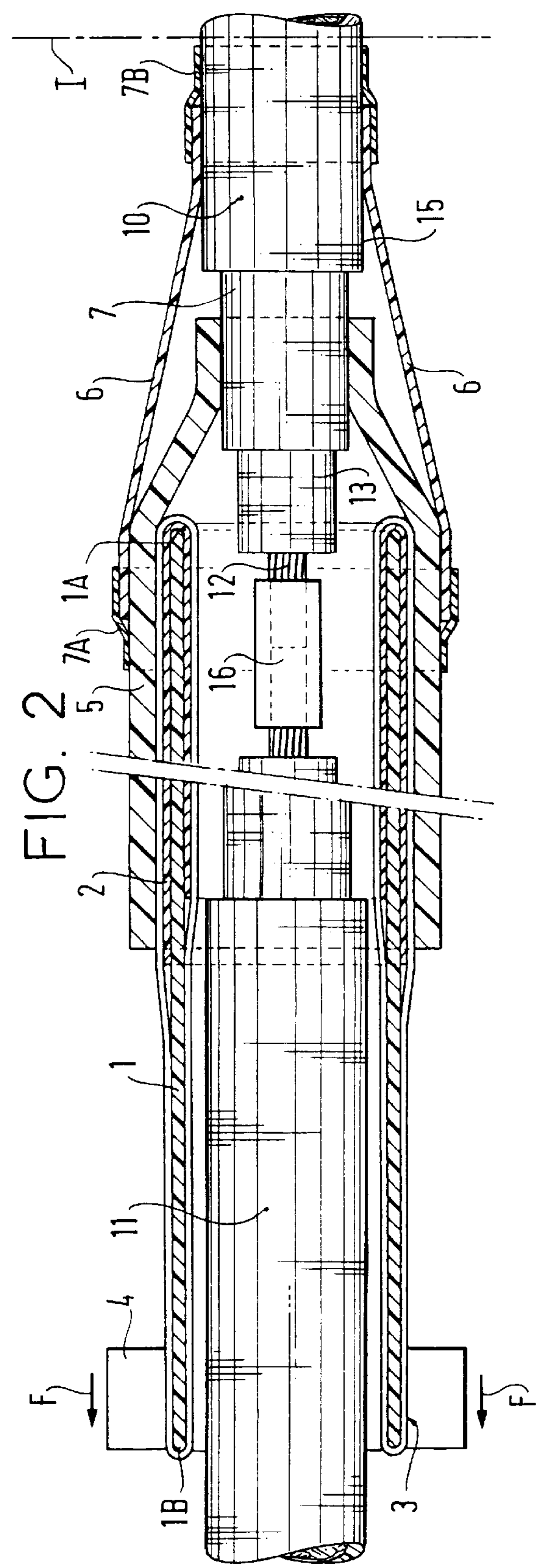
FIG. 2 shows the same assembly while the covering is being laid on two connected-together cables.

FIG. 2 should be compared with FIG. 1 and illustrates laying the sleeve 5 on the terminal portions of two interconnected electrical cables 10 and 11, where the two interconnected cables constitute the element that is to receive the sleeve.

Each of the cables comprises a central conductor 12, insulation 13 on the conductor, shielding 7 on the insulation, and an outer sheath 15, and the terminal portion thereof is striped and cut down as can be seen for the cable 10. A coupling 16 electrically interconnects the stripped conductors and mechanically interconnects the two cables.

The sleeve 5 expanded on its rigid support 1 is located initially on one of the cables, in this case the cable 11, and is subsequently positioned over both of the interconnected cables so as to enable it to be laid over the coupling and to extend on either side thereof over the screening of each cable. It is secured mechanically to the cable 10 by strips 6 already fixed thereto, which strips are under tension and thus fixed to the cable 10. An adhesive tape 7B fixes the strip onto the sheath 15 of the cable 10, which strips are cut if they are too long. The support 1 is disengaged by force, by pulling it in the direction of arrow F along the cable 11, and the sleeve is thus progressively laid accurately over the desired location on which it was positioned and held mechanically so as to avoid moving when the support is taken away.

Subsequently, the strips 6 are separated from the sleeve 5 which is shrunk in situ.

Line I which is perpendicular to the cable 10 and quite close to its stripped terminal portion, also represents a limit beyond which access around the cable has not been made, either because access was not required beyond said limit or because access could not be made beyond said limit. Said limit makes it essential to take the laying support away along the other cable, in which case the support is constituted by a single piece.

Naturally, if the limit for access around the cable 10 is far enough away from the stripped terminal portion of the cable, the support for laying the sleeve can be in two portions, which are then located end to end beneath the expanded sleeve. Under such conditions, one of the portions is taken away along the cable over which it extends, after the expanded sleeve has been secured in accordance with the invention to the other cable. The other portion is taken away along the other cable after the sleeve has been released from said other cable.

Figure 3:
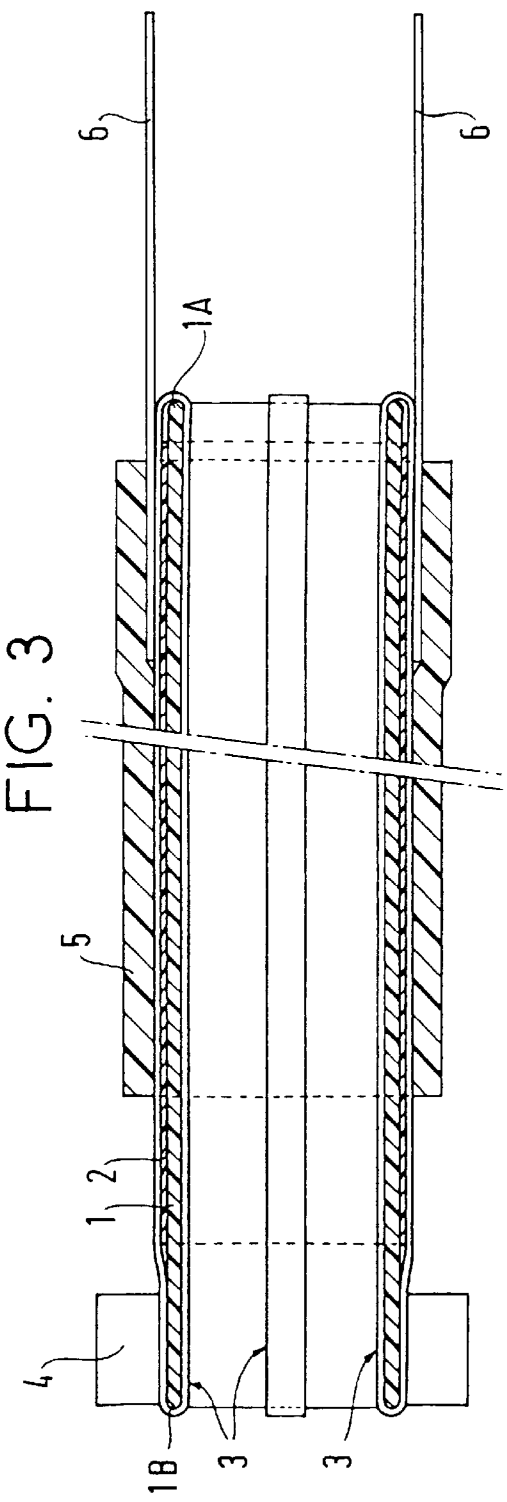
FIGS. 3 and 4 show variants given relative to FIG. 1.

In a variant compared with FIG. 1, and as shown in FIG. 3, the above-mentioned securing strips 6 are fixed to the sleeve by clamping one of their terminal portions between the expanded sleeve 5 and the laying support 1 carrying it, thereby fixing them directly to the expanded sleeve by the compression force exerted by said expanded sleeve. These strips are thus fixed to the sleeve while the sleeve is being installed in expanded form on its laying support. In this way, they remain fixed to the sleeve so long as the laying support has not been taken away from beneath the sleeve over the length of the mutually clamped-together terminal portions of the strips. After the operation of laying the sleeve has been completed, the same terminal portions of the strips remain beneath the sleeve and they are taken away in turn manually from beneath the sleeve.

Figure 4:
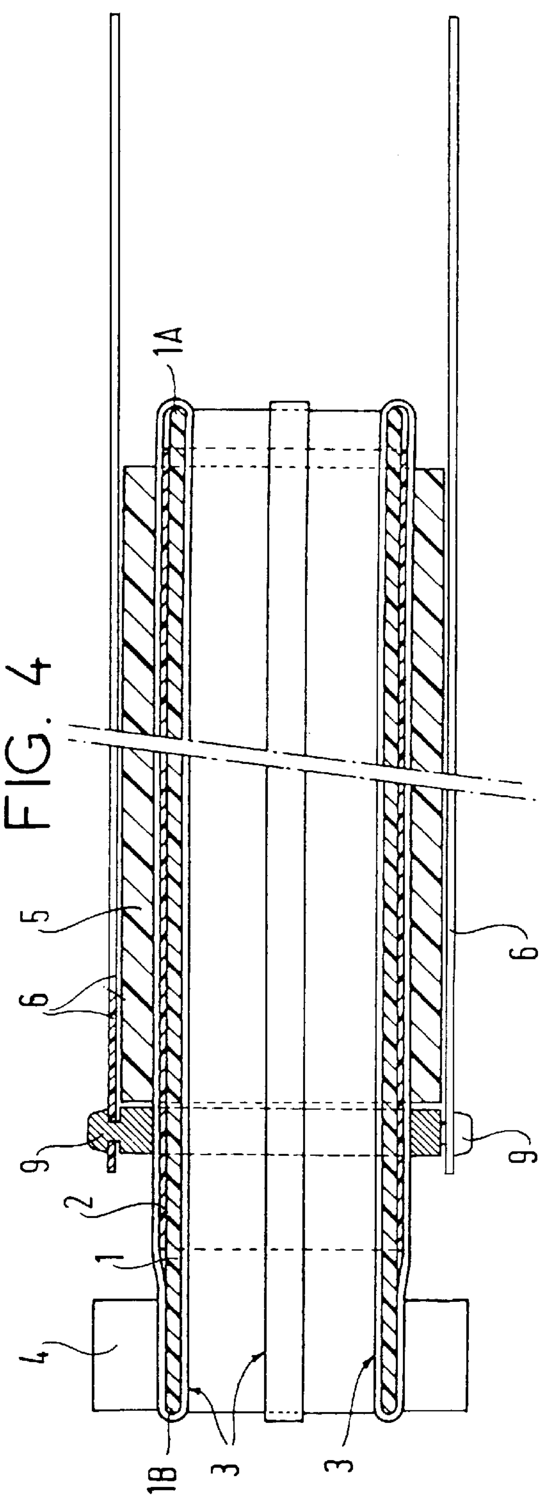

In FIG. 4, the securing strips 6 are longer than in FIGS. 1 to 3 so that, as before, they project a considerable distance from the end 1A of the support, and from the corresponding end of the expanded sleeve 5 on said support. They also project some way from the opposite end of the sleeve. They are fixed thereto by a coupling ring or the like 9 which is fitted to receive and retain the first terminal portions of the strips 6 that rest on the periphery of the support by being put into abutment against the end of the sleeve situated adjacent to the end 1B of said support. Thus, for the operation of laying the sleeve in place, these strips are tensioned along the sleeve and are fixed to the element that is to receive them. While the support is being taken away, the tension exerted on the strip prevents any longitudinal displacement of the sleeve relative to the element on which it is being shrunk.

In a variant (not shown) relative to the variant of FIG. 4, the retaining ring may be fixed by adhesive or other means to the periphery of the sleeve, or it may be directly secured to the sleeve if the sleeve is molded.

It is also mentioned that the ring is not necessarily continuous over the periphery of the sleeve.

In a variant relative to FIGS. 1 to 4, the securing means may be an auxiliary securing sleeve which is used instead of strips and which has the same mechanical characteristics as such strips.

In another variant relative to FIGS. 1 and 4, the strips or the auxiliary securing sleeve may be fixed to the sleeve by adhesive or otherwise.

It is also specified that the securing means may be fixed to the expanded sleeve in a factory so that the sleeve expanded over the laying assembly is initially provided with means for securing it to the element that is to receive it, or that are suitable for being fixed to the sleeve on the laying site.

It is also specified that the expanded covering on its support may be a single one-layer or multi-layer sleeve, or it may be constituted by two superposed sleeves which are then made simultaneously.

I claim:

1. A method of positioning an elastic tubular covering on an element, comprising the steps of:

mounting said covering on a rigid tubular support so that said covering is in an expanded condition;

positioning the expanded covering carried by said support around said element;

removing said support at least in part from beneath said expanded covering, by pulling on said support from a first end thereof, said support being of dimensions designed to allow it to be mounted loosely on said element; and prior to removing the support from beneath the covering, providing temporary physical connection between said expanded covering on said support positioned on said element and a circumferential surface of the element situated beyond a second end opposite from the first end of said support, which serves to hold said covering in position while the support is being removed.

2. A method of tightly laying an elastic tubular covering on an element as recited in claim 1, wherein the element is a cable.

3. An assembly according to claim 1, wherein the element is a cable.

4. An assembly for positioning a resilient tubular covering on an element, the assembly comprising:

a rigid tubular support of dimensions enabling it to be mounted loosely on the element;

the covering being mounted in expanded form on said support when said support is at least partially removed from beneath said covering by pulling on the support from a first one of its ends;

auxiliary securing means, being secured to said element, that are flexible, strong in traction, and not stretchable for temporarily mechanically securing said covering expanded on said support to a portion of said element on which said support is not mounted wherein said portion of said element is along a circumferential surface of the element.

5. An assembly according to claim 4, wherein said auxiliary securing means includes strips each having a first terminal portion prevented from moving in translation relative to the covering expanded on said support and a second terminal portion projecting beyond the second end of said support for enabling said strips to be fixed to the circumferential surface of said element.

6. An assembly according to claim 5, in which said strips each have a series of holes along the second terminal portions thereof for indexing a position of the expanded covering relative to said element.

7. An assembly according to claim 4, wherein said auxiliary securing means are constituted by a sleeve having a first terminal portion fixed to the covering and having a second terminal portion projecting beyond the first end of said support and fixed to said element.

8. An assembly according to claim 4, wherein said auxiliary securing means are mounted outside said expanded covering and extend over at least a portion of the length thereof.

9. An assembly according to claim 4, wherein said auxiliary securing means are mounted internally, between said expanded covering and said support, for fixing directly to the expanded covering on said support.

10. An assembly according to claim 4, including mechanical coupling means fitted to receive and lock a first terminal portion of said auxiliary securing means, and prevented from moving in translation along said expanded sleeve towards a second end of said support.

11. An assembly according to claim 10, wherein said coupling means are constituted by a ring, slidable on said support adjacent to the first end thereof and prevented from moving in translation towards the second end of said support by coming into abutment against said expanded covering.

12. An assembly according to claim 10, wherein said coupling means project from the periphery of said expanded covering.

* * * * *